United States Patent [19]

Porter

[11] Patent Number: 5,456,235
[45] Date of Patent: Oct. 10, 1995

[54] FUEL SYSTEM

[75] Inventor: Marshall R. Porter, St. Louis, Mo.

[73] Assignee: Carter Automotive Company, Inc., Southfield, Mich.

[21] Appl. No.: 349,851

[22] Filed: Dec. 6, 1994

[51] Int. Cl.[6] .................................................. F02M 37/04
[52] U.S. Cl. .......................... 123/509; 123/514; 137/572
[58] Field of Search ..................................... 123/509, 514, 123/497, 516; 137/587, 572

[56] References Cited

U.S. PATENT DOCUMENTS

| | | | |
|---|---|---|---|
| 4,546,750 | 10/1985 | Brunell et al. | 123/509 |
| 4,672,937 | 6/1987 | Fales et al. | 123/509 |
| 4,869,225 | 9/1989 | Nagata et al. | 123/509 |
| 4,893,647 | 1/1990 | Tuckey | 123/514 |
| 4,928,657 | 5/1990 | Asselin | 123/509 |
| 4,971,017 | 11/1990 | Beakley | 123/509 |
| 4,974,570 | 12/1990 | Szwargulski et al. | 137/572 |
| 5,050,567 | 9/1991 | Suzuki | 123/509 |
| 5,218,942 | 6/1993 | Coha et al. | 123/509 |
| 5,363,827 | 11/1994 | Siekmann | 123/509 |

*Primary Examiner*—Thomas N. Moulis
*Attorney, Agent, or Firm*—Lawrence J. Shurupoff

[57] ABSTRACT

An engine fuel supply system includes a fuel pumping unit located outside the fuel tank for pumping fuel from the tank to the engine. The pumping unit includes a motor operated fuel pump positioned in a reservoir that is partitioned to form a lower chamber and an upper chamber. The pump inlet is connected to the lower chamber for pumping fuel into a pressure line leading to the engine. Excess fuel not used by the engine cylinder injectors is returned to the upper chamber for eventual flow into the lower chamber and recycling through the pump. The upper chamber provides the pump with an emergency supply of fuel that can be called upon when the fuel tank is in an empty condition. The upper chamber also acts as a cooling device for cooling heated excess fuel returned from the engine to the pumping unit.

17 Claims, 7 Drawing Sheets

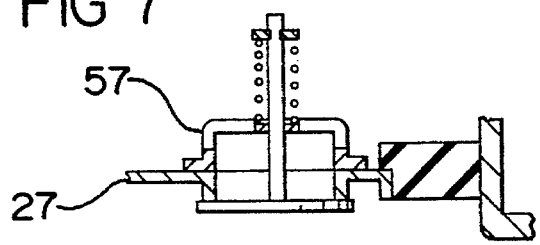
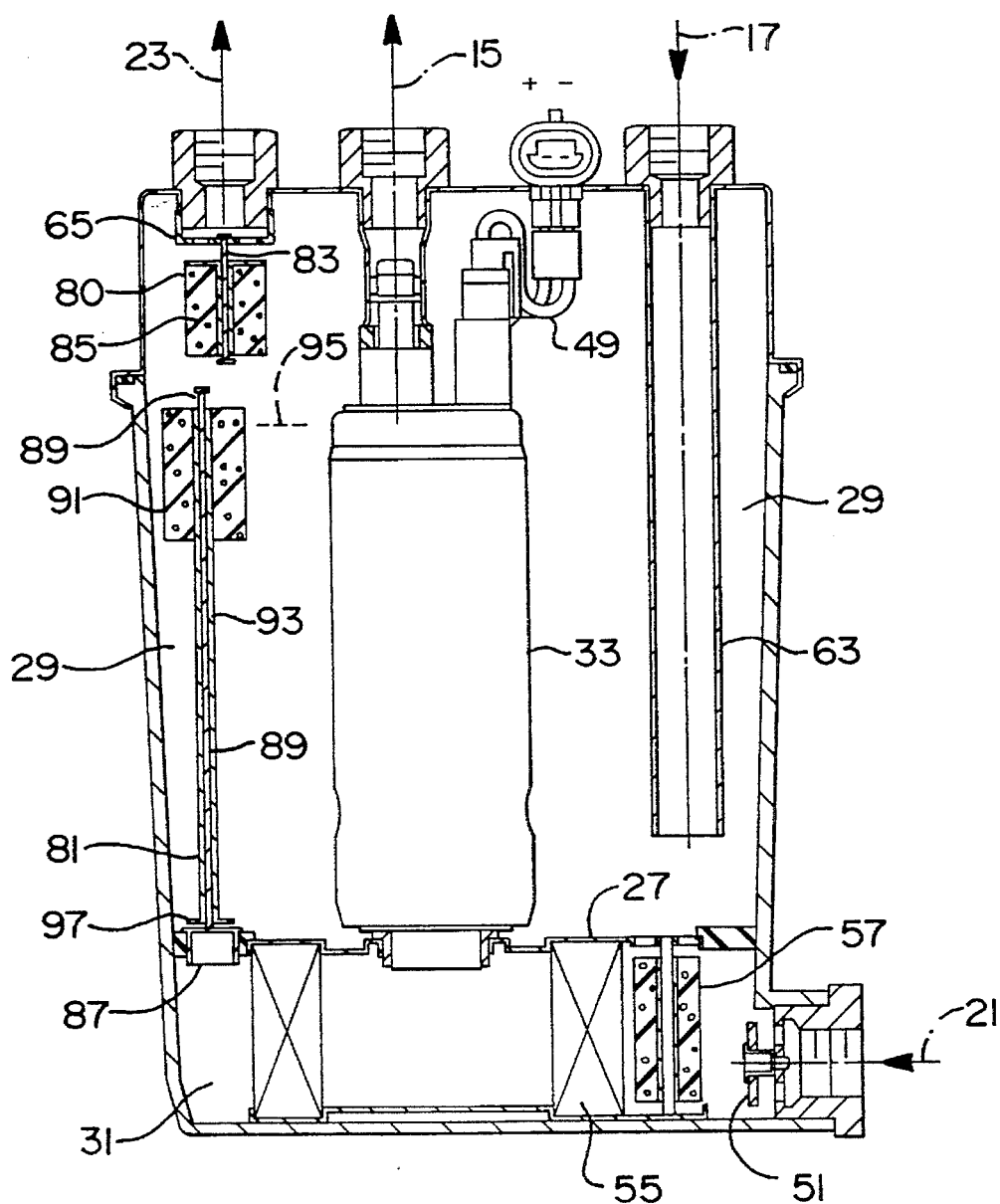

FUEL SYSTEM

BACKGROUND OF THE INVENTION

1. Field of the Invention

The present invention relates in general to a fuel pumping unit for pumping gasoline or other liquid fuel from a fuel tank to an engine, and particularly to such a unit which minimizes the production of fuel vapors in a fuel tank.

2. Description of Prior Developments

In some engine fuel supply systems, the fuel pump is located in a reservoir within the main fuel tank. The reservoir contains a reserve supply of fuel that is available to the pump when the tank runs out of fuel, or when the fuel in the tank sloshes back and forth so as to be momentarily out of contact with the pump inlet.

The location of the pump and reservoir in the fuel tank can bring about some problems. For example, servicing the pump within the tank is relatively difficult and time consuming. Also, it is difficult to mount a standard fuel pumping unit in a range of differently sized fuel tanks. Each installation has to be tailored to fit a particular fuel pumping system to a given size fuel tank.

Fuel supply systems for engines equipped with fuel injectors are designed to supply excess quantities of pressurized fuel to the injectors. Fuel not used by the injectors is ordinarily returned to the fuel tank for assimilation back into the fuel supply.

During its passage through the fuel injector system, the unused fuel is generally heated by contact with heated engine surfaces, so that the fuel returned from the engine to the fuel tank is in a heated condition. In conventional arrangements, the heated fuel mixes with the fuel in the tank thereby raising the temperature level in the tank fuel. This is disadvantageous in that the relatively high temperature levels can generate excess fuel vapor which poses a potential air pollution problem.

SUMMARY OF THE INVENTION

The fuel supply system of the present invention is designed so that heated fuel, returned to the system from the engine, is directed to a remote reservoir associated with the fuel pump and not to the main fuel tank. Additionally, the pump is connected to the reservoir and the tank so that, when the reservoir has a sufficient quantity of fuel, the connection between the reservoir and pump inlet has a lesser flow resistance than the connection between the tank and the pump inlet.

Under such conditions, the pump takes fuel from the reservoir instead of from the main tank. This is advantageous in that the pump is pumping heated fuel from the engine and not cool fuel from the tank. The production of fuel vapors is reduced so as to avoid potential air pollution problems that such vapors might generate, e.g., when the tank is opened to add fuel.

The invention is further directed to an engine fuel supply system wherein the fuel pump is located in a reservoir positioned outside and remote from the main fuel tank. The reservoir is internally partitioned to form an upper chamber and a lower chamber. The pump is located in the upper chamber to pump fuel to an external line leading to the engine. Relatively hot fuel not used by the engine is returned to the upper chamber of the reservoir for storage and recycling through the pump. Hot fuel is not returned directly to the fuel tank so that production of fuel vapors within the fuel tank is reduced.

The lower chamber in the reservoir has a connection with the main fuel tank, whereby fuel is taken as needed. The lower chamber has a second fluid connection with the upper chamber, whereby fuel can flow into the lower chamber from either the main tank or the upper chamber. The lower chamber is in direct fluid connection with the pump inlet such that all fuel supplied to the pump goes through the lower chamber.

The lower chamber receives fuel from the main fuel tank and also from the upper chamber. However, the connections are such that the flow resistance of the flow path from the upper chamber to the lower chamber is less than the flow resistance of the flow path from the main tank to the lower chamber. Therefore, when the upper chamber has a sufficient quantity of fuel therein, the lower chamber will take liquid from the upper chamber in preference to the main tank. In this manner, the system requires the pump to pump relatively hot fuel returned from the engine instead of relative cool fuel from the main tank. The operation is such as to reduce the generation of fuel vapors associated with the fuel pumping activity.

The pump uses fuel from the main tank essentially only when there is insufficient fuel in the upper chamber, i.e. the pump draws fuel from the tank only when the liquid level in the upper chamber drops to a predetermined value. The upper chamber in the fuel reservoir acts as a container for a reserve supply of fuel, usable by the pump when the main tank is empty or when the fuel in the tank is sloshing back and forth, so as to deprive the lower chamber of an adequate supply of fuel. The upper chamber in the fuel reservoir is connected to the lower chamber by a pressure-responsive valve. Additionally, the connection between the tank and reservoir includes a control valve that prevents reserve flow of fuel back to the tank.

Under emergency conditions, i.e. when the tank is in a near empty condition or when the lower chamber is momentarily deprived of fuel, the control valve automatically closes the connection between the tank and lower chamber, whereby the pump suction is applied through the lower chamber to the pressure-responsive valve. The pressure-responsive valve is thereby opened to pass fuel from the upper chamber into the lower chamber so as to provide the pump with a source of fuel during the emergency condition.

BRIEF DESCRIPTION OF THE DRAWINGS

In the drawings:

FIG. 7 shows a pressure-responsive valve that can be used in the FIG. 1 pumping unit.

FIG. 8 is a sectional view taken in the same direction as FIG. 1, but showing another form of the invention.

DETAILED DESCRIPTION OF THE PREFERRED EMBODIMENTS

Figure 1:
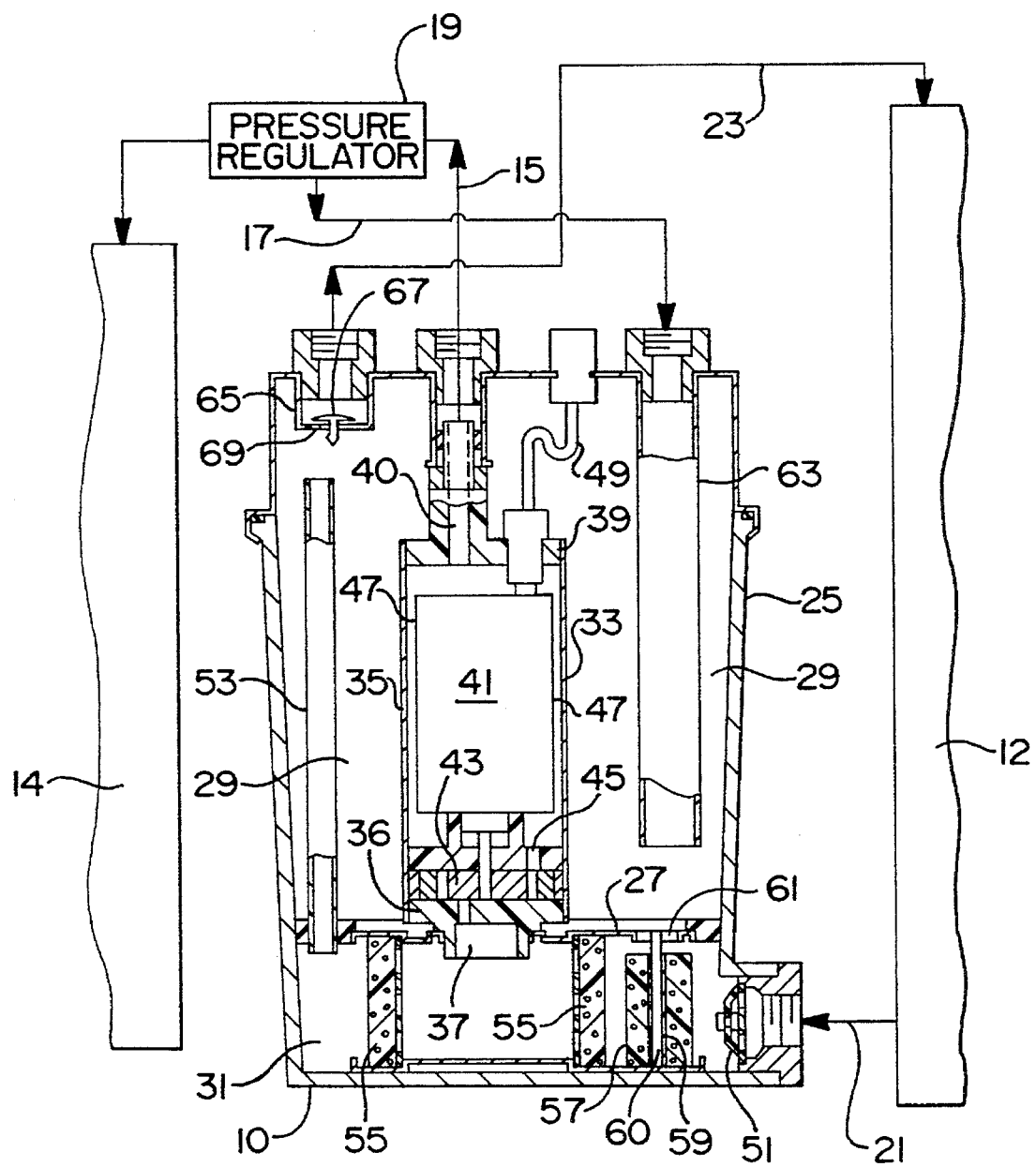
FIG. 1 is a sectional view taken through a fuel pumping unit embodying the invention. The pumping unit is shown with the fluid connections that are used between the pumping unit and the engine and main fuel tank.

As shown in FIG. 1, an engine fuel system includes a fuel pumping unit 10 in association with a fuel tank 12 and an engine 14. The engine is provided with a system of fuel injectors supplied with pressurized fuel from pumping unit 10 via a high pressure line 15. Excess fuel, not used by the injectors, is returned to pumping unit 10 via a drain line 17. The fuel flowing through line 17 is in a relatively heated condition as a result of its passage adjacent the hot engine. The injector control system includes a pressure regulator 19 on the engine for maintaining a desired pressure at the injector ports.

Tank 12 is connected to fuel pumping unit 10 via a line 21 extending from the lower end of the tank, whereby fuel is supplied to pumping unit 10 by gravitational force together with a suction force generated by a motor operated pump located in pumping unit 10.

A fuel vapor line 23 extends from the upper end of pumping unit 10 to an elevated connection on tank 12, whereby pressurized fuel vapors accumulating in unit 10 are fed to the fuel tank for assimilation with the tank fuel. The relatively cool tank liquid will, under most conditions, condense the vapors so as to avoid undue pressures in the tank space above the fuel level.

Fuel pumping unit 10 includes a reservoir or liquid housing 25 having a horizontal partition 27 therein subdividing the reservoir interior space into an upper chamber 29 and a lower chamber 31. A motor operated fuel pump 33 is located in upper chamber 29.

Pump 33 includes a pump housing 35 having a lower end wall 36 that forms a liquid inlet 37 communicating with lower chamber 31. The pump housing further includes an upper end wall 39 that forms a liquid outlet 40 communicating with the high pressure line 15.

An electric motor 41 is mounted within housing 35 for powering a pump impeller to move liquid fuel upwardly from lower chamber 31 into high pressure line 15. The pump impeller can take the form of a drive gear 43 in mesh with one or more eccentric gears for pumping liquid fuel through an opening 45 into the annular space 47 surrounding motor 41. The fuel is transported upwardly through outlet 40.

Motor 41 is supplied with D.C. electrical power through insulated electrical wiring 49 extending downwardly from an electrical connector on end wall 39. The pump construction can be a commercially available pump structure.

Figure 2:
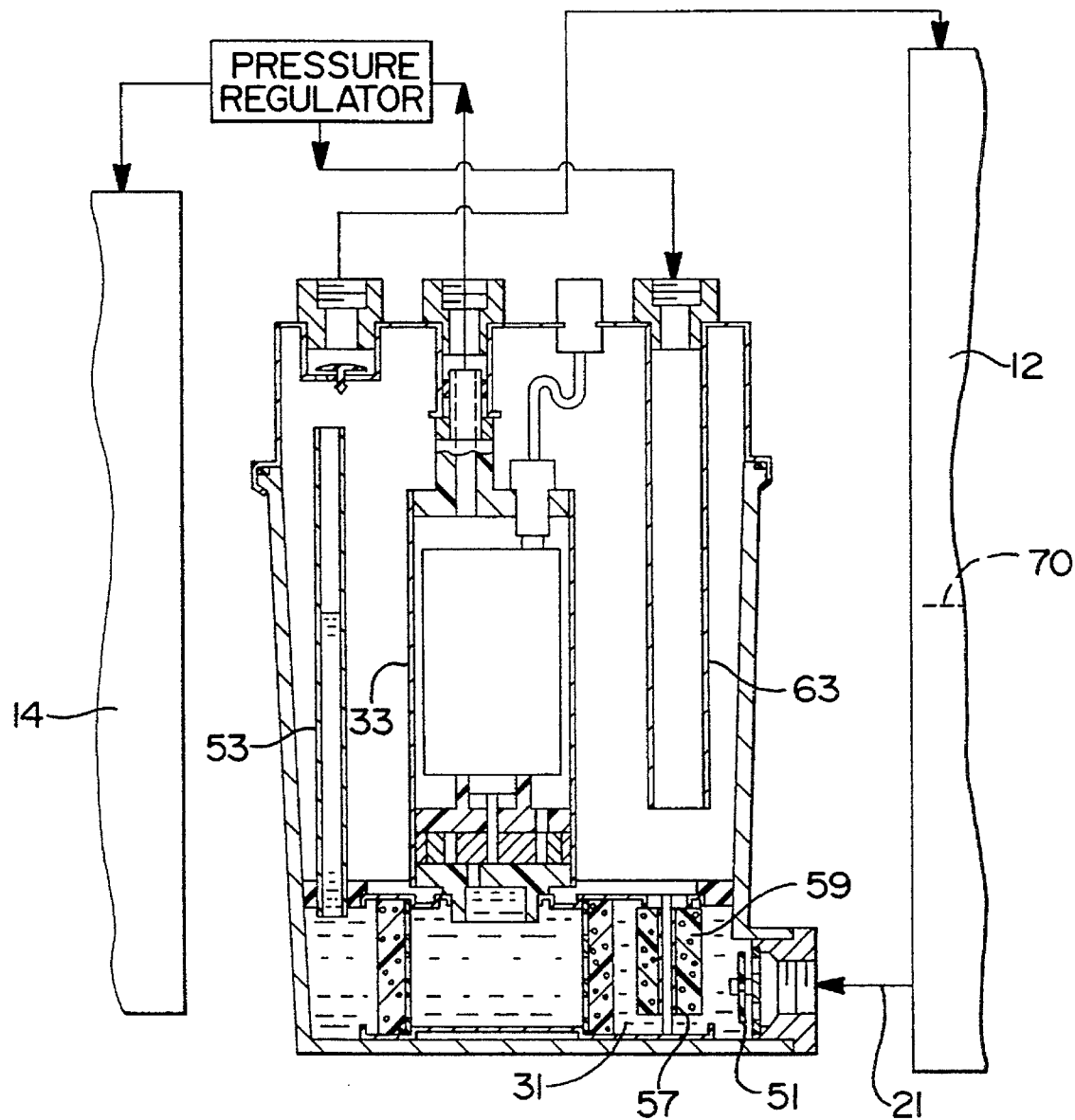
FIGS. 2 through 6 are views taken in the same direction as FIG. 1, but with various different fuel levels in the fuel tank.
Figure 3:
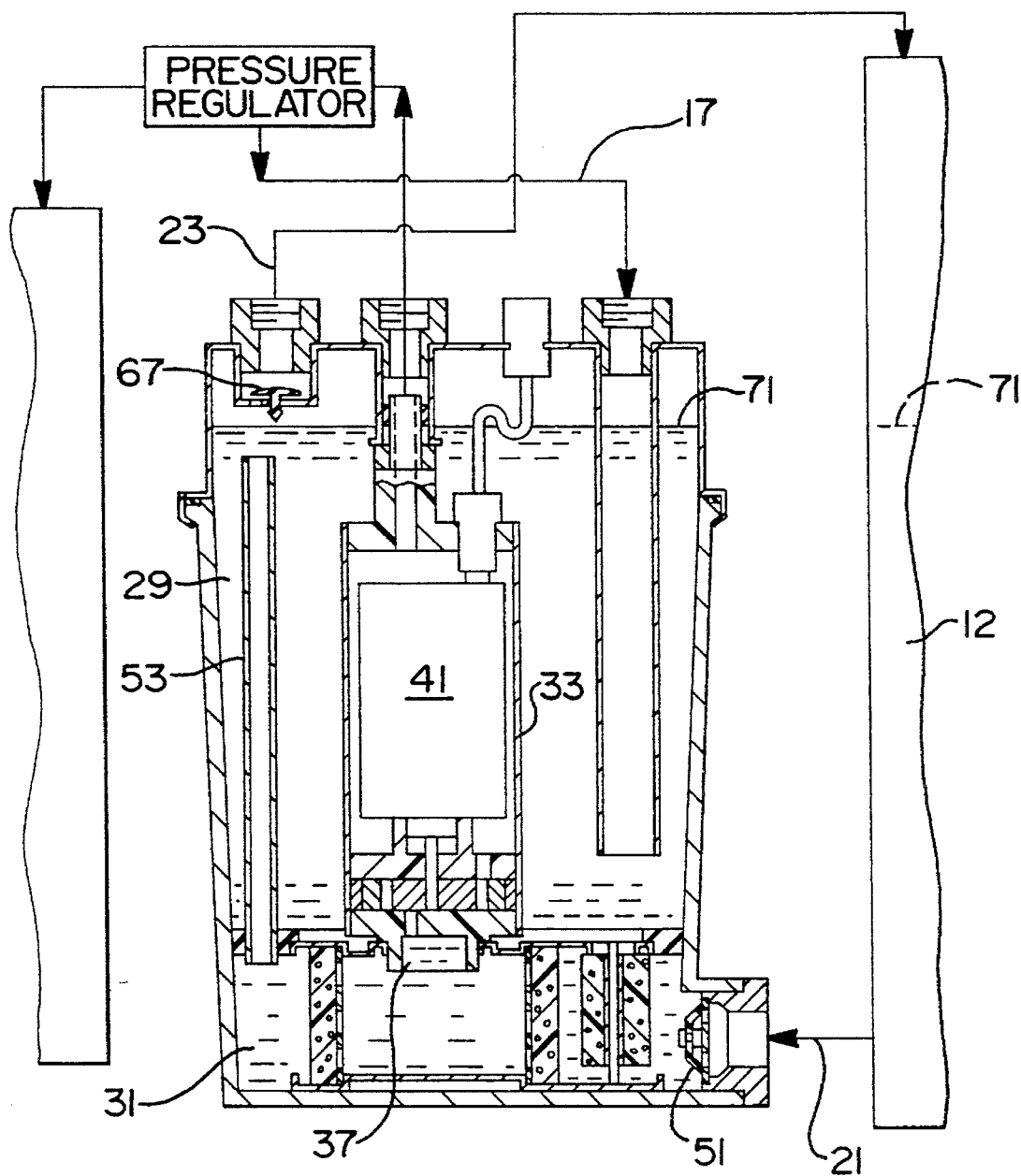

FIG. 1 is taken with the system in an empty condition, i.e. with no fuel in tank 12 or in pumping unit 10. The fuel supply line 21 from tank 12 to lower chamber 31 contains a check valve 51 that is in a closed condition when tank 12 is in an empty condition, as depicted in FIG. 1. When tank 12 has liquid fuel therein, the pressure in line 21 will force check valve 51 to an open condition, as depicted in FIGS. 2 and 3.

Figure 4:
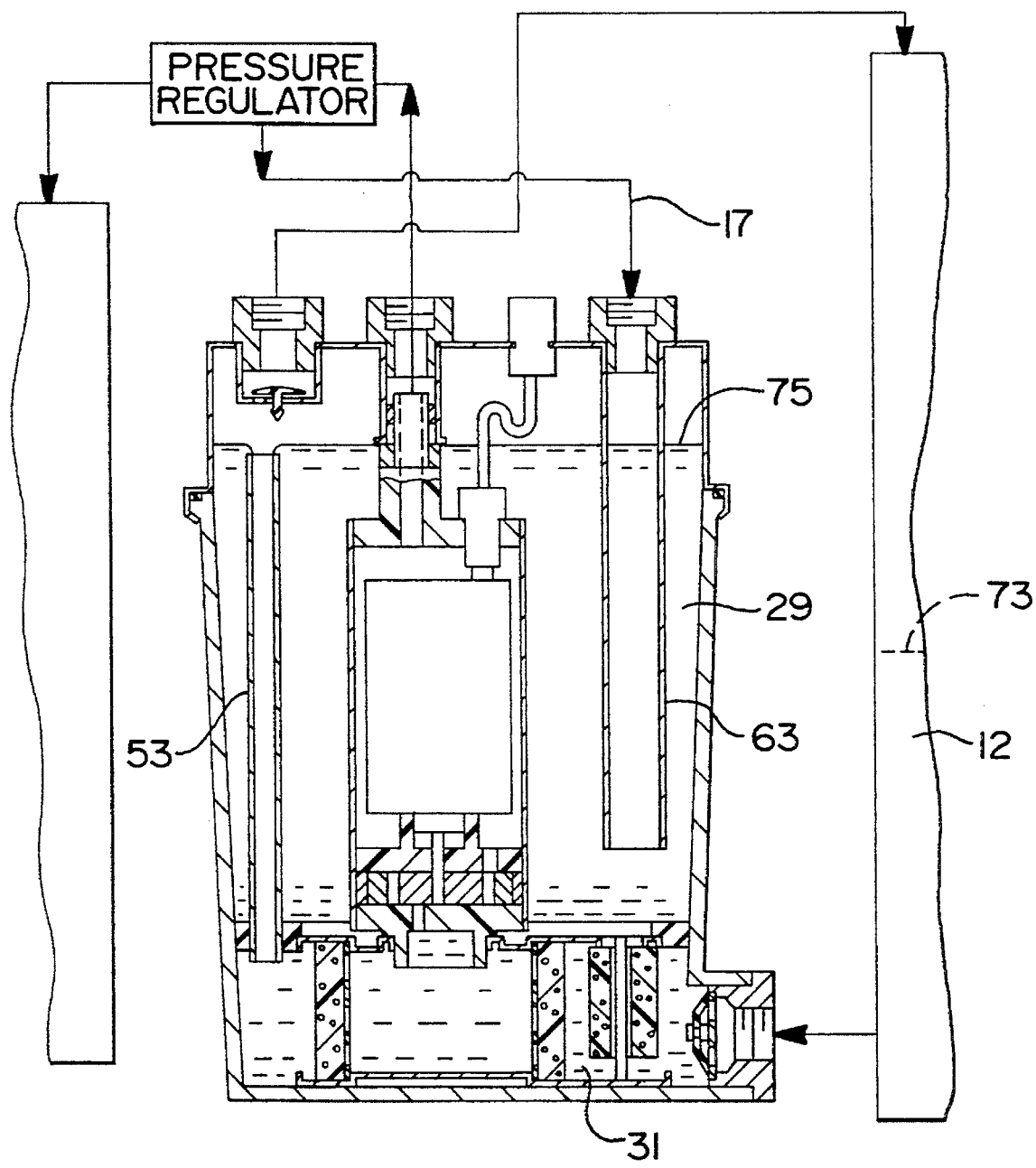
Figure 5:
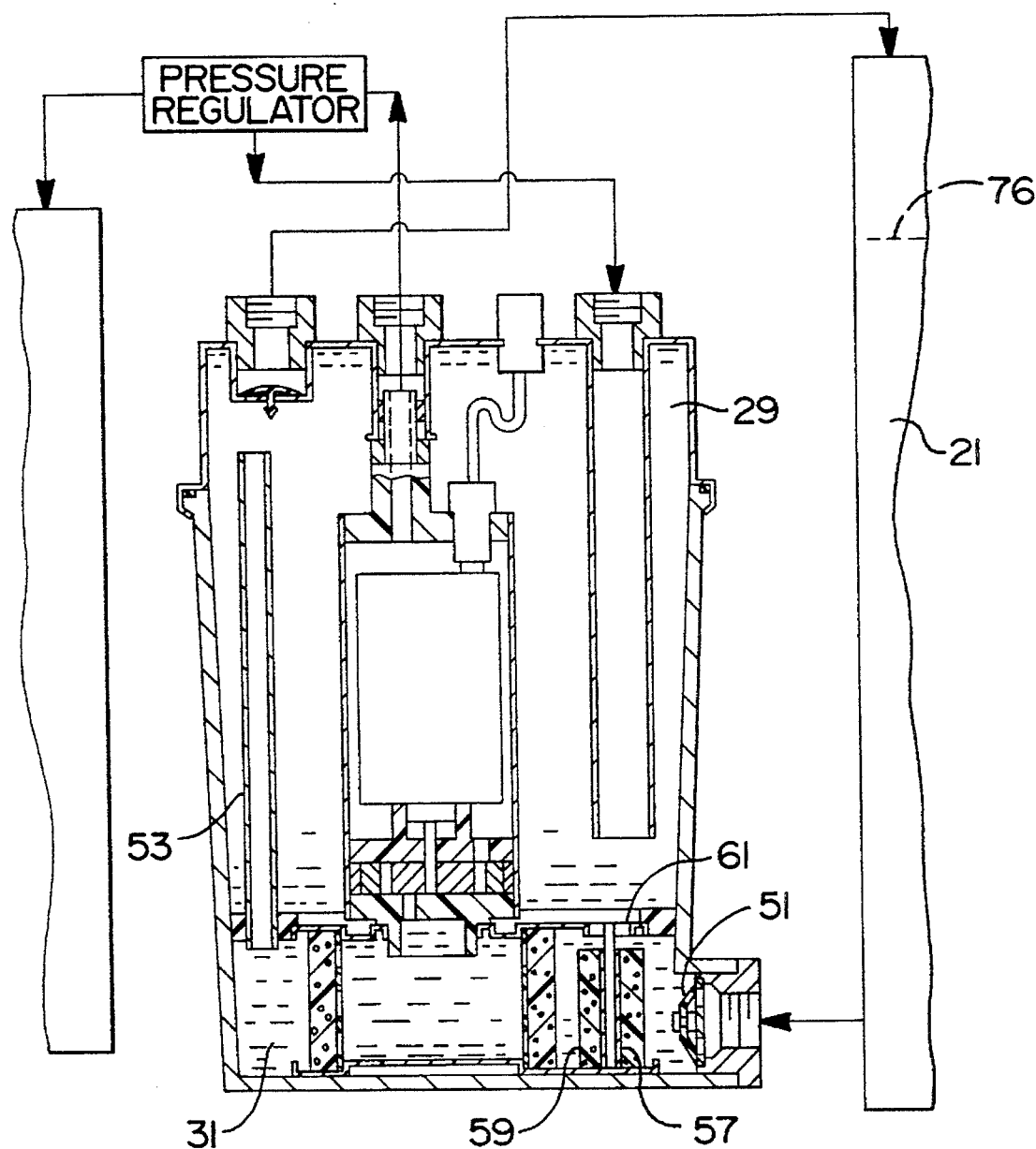

A filler tube 53 has its lower end mounted in partition 27 to provide a fluid connection between lower chamber 31 and upper chamber 29. When the fuel level in chamber 29 is at or above the upper end of tube 53, fuel can flow gravitationally downward through tube 53, i.e. from chamber 29 into chamber 31. FIGS. 3, 4 and 5 show fuel levels in chamber 29 that can permit downflow of liquid fuel in tube 53. Tube 53 also vents air from chamber 31 during fuel filling.

Figure 6:
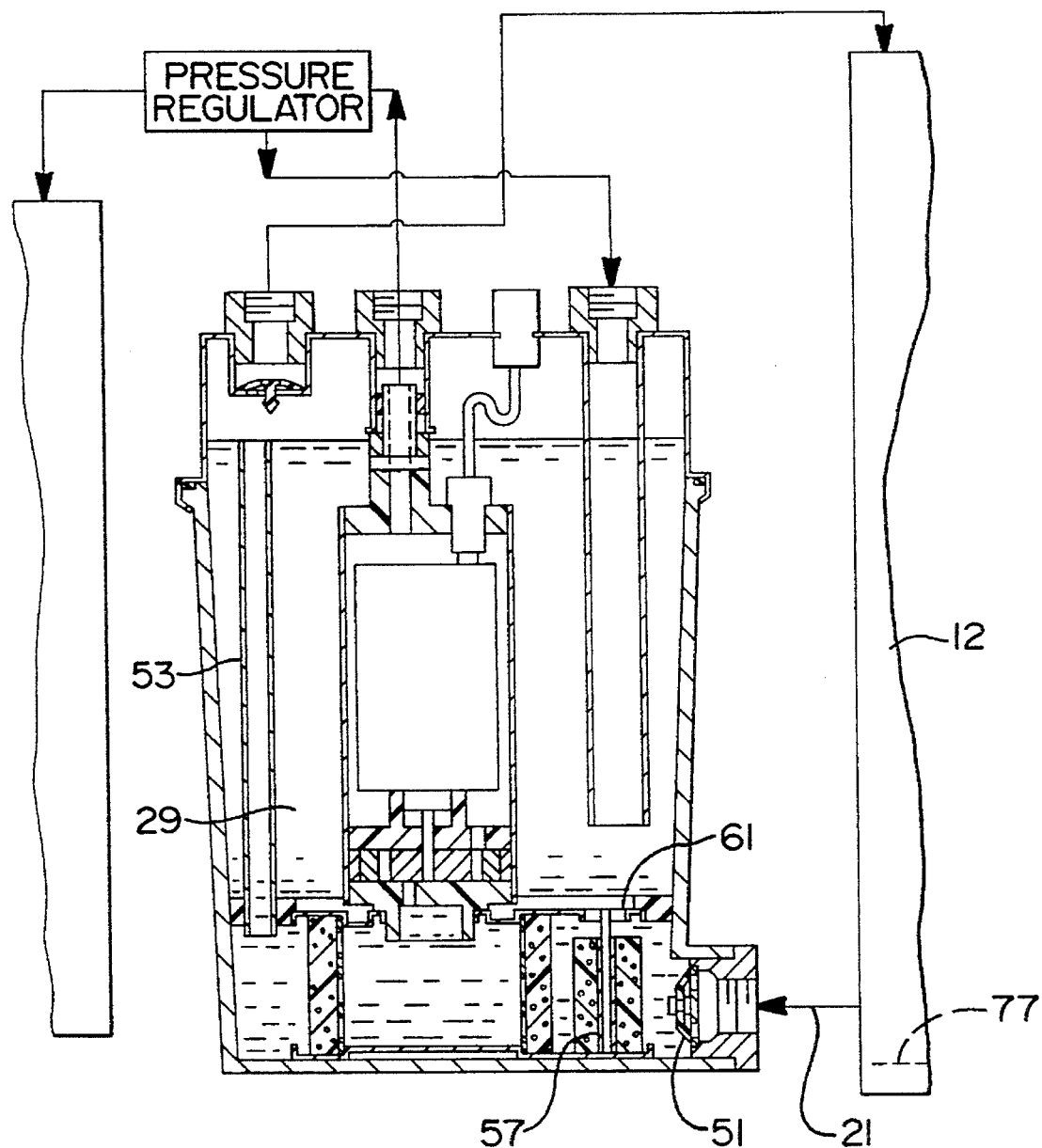

There is mounted in chamber 31 an annular porous filter 55 formed of a porous material, e.g., open celled plastic foam, whereby contaminants in the fuel are prevented from reaching the pump inlet 37. In the chamber space outside filter 55, which is upstream from the filter, there is mounted a pressure-responsive valve 57. Valve 57 is shown as a float valve that can be formed out of a closed cell plastic foam material into an annular cylinder configuration. The cylindrical float element 59 can be slidably mounted on a vertical rod 60 for movement toward or away from a port 61 in partition 27. FIGS. 1, 5 and 6 show the float valve in an open condition wherein liquid fuel can flow downward from upper chamber 29 into lower chamber 31. FIGS. 2, 3 and 4 show the float valve in a closed condition wherein there is no flow through port 61, assuming no leakage at the port-valve interface.

Float valve 57 constitutes one type of valve construction for the pressure-responsive valve between chambers 29 and 31. However, other valve constructions can be used. FIG. 7 shows a spring biased poppet valve that can be used. In the FIG. 7 valve arrangement, the valve element is moved to the open condition by the liquid head in chamber 29. With either valve construction, FIG. 1 or FIG. 7, the pump suction exerts a force on the liquid in chamber 31 that enables the valve to move to the open position.

Partition 27 preferably serves as a mounting surface for the pressure-responsive valve, filter 55 and filter tube 53 to facilitate access to these components when the partition is lifted out of the two-piece housing 25. The upper housing element of housing 25 is separable from the lower housing element to gain access to the components within housing 25.

The upper wall of housing 25 supports a vertical tube 63 that serves as a return tube for conveying excess fuel from drain line 17 into the lower portion of chamber 29. The heated excess fuel enters chamber 29 at a point proximate to the partition 27, whereby the heated fuel is mixed with any liquid fuel in chamber 29 before making contact with the space above the chamber 29 liquid. Tube 63 mixes the heated fuel from line 17 with the chamber 29 liquid, whereby vapors in the heated fuel tend to be condensed to a liquid state. Vapor accumulations in chamber 29 are thereby minimized to a certain extent.

The upper wall of reservoir or housing 25 mounts a small cup-shaped support 65 for a check valve 67. A relatively small opening 69 is provided in support cup 65, whereby pressurized vapors can pass upwardly from chamber 29 through opening 69 to exert a force on the undersurface of valve element 67. With a sufficient force, the valve element will be deflected upwardly to an open condition as shown, for example, in FIGS. 3 and 4.

Valve element 67 is designed to resist liquid flow from chamber 29 into vapor line 23 resulting from an increased liquid head in chamber 29 while restricting the flow of liquid into line 23. A small port can be formed in valve 67 to permit gas flow when the valve is in the closed position. Alternately, the check valve can be designed so that in its open position only a small flow opening is formed whereby the flow is predominately gaseous, with essentially no liquid component.

The main function of line 23 is to convey pressurized vapors from chamber 29 to tank 12. Check valve 67 prevents reverse flow in line 23 from the tank to chamber 29. Liquid flow in line 23 from chamber 29 to tank 12 is not advantageous in that it can clog the line so as to retard or slow the flow of pressurized vapor from chamber 29 to tank 12. Some liquid flow in line 23, due to condensation or pressure forces, is not a serious obstacle to satisfactory performance of the system.

FIGS. 2 through 6 illustrate various conditions of the system that are possible, resulting from different fuel levels in tank 12 and different engine operating conditions.

FIG. 2 shows a condition that can prevail when tank 12 is filled to the level designated by numeral 70. Liquid fuel will fill chamber 31 and the filler tube 53 to a level below the upper end of tube 53. Check valve 51 is open, and pressure-responsive valve 57 is closed due to the buoyancy of float 59. Under the condition depicted in FIG. 2, the pump 33 will obtain fuel solely from tank 12, i.e. through line 21.

FIG. 3 shows a condition wherein the fuel level in tank 12 is designated by numeral 71. The liquid level in reservoir 25 will have the same level 71 such that filler tube 53 is completely filled. Check valve 51 is designed to offer a greater resistance to forward fuel flow than the resistance offered by filler tube 53. Consequently, when pump motor 41 is energized, the liquid in filler tube 53 will have a less restrictive path for down flow into chamber 31 than the liquid in line 21.

As pump 33 withdraws fuel from the space below inlet 37, new fuel will move into chamber 31 predominately from tube 53 rather than from line 21. As long as the liquid level in chamber 29 is at or above the upper end of tube 53, the tube will be filled so as to provide the primary source of fuel for the pump. This is advantageous in that, under certain conditions, the fuel in chamber 29 is in a heated condition resulting from the fact that excess heated fuel is being returned to chamber 29 through the drain line 17. By using fuel in chamber 29 as the fuel source for pump 33, there is a lessened possibility of vapor accumulation in the fuel supply system.

The above description of FIG. 3 presupposes that the engine has been in operation for a sufficient time to generate significant flow of heated fuel through line 17. At engine start-up, the fuel flowing through line 17 may not be sufficient to appreciably heat the fuel in chamber 29. In any event, when the liquid level in chamber 29 is elevated above the upper end of tube 53, the pump will be drawing fuel primarily from upper chamber 29 via tube 53, rather than from line 21 due to the fact that tube 53 offers a lower resistance to flow than check valve 51. On average, the engine will be using fuel that is heated to some extent such that vapors generated by the fuel in drain line 17 are less likely to accumulate in the system. Any vapors that do accumulate in chamber 29 develop a pressure that opens check valve 67, whereby the vapors are returned through line 23 to the tank 12 for condensation by the tank liquid.

When the liquid level in chamber 29 drops below the upper end of filler tube 53, chamber 31 will receive new fuel from line 21 through check valve 51. Thus, the suction force of pump 33 will be applied to check valve 51, whereby the valve is opened to admit new fuel into chamber 31.

Under some conditions, the liquid level in chamber 29 can be elevated above the level in tank 12 as shown, for example, in FIG. 4. As there shown, the liquid level in tank 12 is designated by numeral 73 and the liquid level in chamber 29 is designated by numeral 75. The difference in liquid level is due to the fact that during engine operation excess fuel is continually being delivered from the engine through line 17 into chamber 29. Liquid can flow downwardly through tube 53 to replenish the fuel supply in chamber 31.

FIG. 5 illustrates a condition wherein the fuel tank is filled to a level 76 that is above the roof wall of chamber 29. Chamber 29 will be completely filled with fuel, as shown in FIG. 5.

Pressure-responsive valve 57 is designed so that when chamber 29 is completely filled the head of liquid in chamber 29 will overcome the buoyancy of float 59, whereby valve 57 is opened. Chamber 31 can, in this situation, receive fuel through filler tube 53 and also through port 61. Check valve 51 will be in a closed condition.

FIG. 6 illustrates the condition wherein the fuel tank is empty or substantially empty such that line 21 is depressurized. The tank fuel level is designated by numeral 77 in FIG. 6. The lack of pressure in line 21 permits the liquid head to close check valve 51 such that, while the pump is drawing fuel out of chamber 31, the pump suction force is effectively concentrated on the fuel above port 61. The pressure-responsive valve 57 is in an open condition even when the liquid level in chamber 29 drops below the upper end of filler tube 53. The pump can thus operate until chamber 29 is empty. Chamber 29 serves as an emergency fuel source to supply the pump with fuel when tank 12 is empty or when fuel is sloshing back and forth in tank 12 to such an extent as to depressurize line 21.

The illustrated fuel supply system is believed to offer several advantages over conventional systems used previously. Thus, chamber 29 provides an emergency fuel supply for the pump when the fuel tank is empty. Also, the system provides for return of heated fuel from the engine to chamber 29 such that, during a significant part of the system operation, the pump is drawing heated fuel from chamber 29 rather than cool fluid from tank 12. This feature minimizes the formation and accumulation of fuel vapors in the system.

The fuel pumping unit 10 is located outside the fuel tank such that servicing and maintenance of the pumping unit is somewhat simplified. Also, it becomes possible for a standard pumping unit to be used on different size fuel tanks. A given pumping unit can be used with a range of different fuel tanks having different heights and configurations. Moreover, the heated fuel returned to the pumping unit is isolated from the fuel tank thereby preventing the heated return fuel from mixing with and heating the tank fuel. This further reduces the production of fuel vapors within the fuel tank.

FIG. 8 shows a variant of the invention wherein check valve 67 (FIG. 1) is replaced by a float valve 80 yet performs in essentially the same fashion as the FIG. 1 arrangement.

Float valve 80 includes a cup-shaped support 65 that mounts a vertical guide rod 83. An annular buoyant float element 85, formed, for example, of a closed cell foam material, is slidable on rod 83 for movement toward or away from the flow ports in cup 65. As the liquid level in chamber 29 rises above the float, the buoyant float moves upwardly to substantially close the valve to the flow of liquid into line 23. The float is preferably designed so that, in the closed position, pressurized gas can flow through the valve. The flat upper surface of the float can have limited clearance with respect to the cup 65 surface to facilitate the flow of gas through the valve.

Float valve 81 further includes an inverted, cup-shaped insert 87 mounted in partition 27 to support an elongated support rod 89. The insert 87 has a number of flow ports surrounding the lower end of rod 89. An annular float 91 is affixed to a tube 93 that is slidably mounted on rod 89. In operation, as the liquid level in chamber 29 rises to a level designated by numeral 95, the float is lifted upwardly so that a flange 97 on the lower end of tube 93 moves away from the flow ports in insert 87. Liquid can thus flow from chamber 29 downwardly into the lower chamber 31. The float valve assembly 81 thus serves the same function as the previously described filler tube 53.

Obviously, numerous modifications and variations of the present invention are possible in the light of the above teachings. It is therefore to be understood that within the scope of the appended claims, the invention may be practiced otherwise than as specifically described herein.

What is claimed is:

1. An engine fuel system, comprising:

a fuel tank;

a fuel pumping unit located outside the fuel tank, said fuel pumping unit comprising a reservoir, a partition within said reservoir subdividing said reservoir into an upper chamber and a lower chamber;

a fuel pump in said upper chamber, said pump having an inlet communicating with said lower chamber and an outlet communicating with a space outside the reservoir;

a first fuel supply line communicating the fuel tank and said lower chamber;

a second fuel supply line communicating the pump outlet and the engine;

a fuel return line connected to said upper chamber for returning unused fuel to the pumping unit;

a vapor line communicating said upper chamber and the fuel tank for delivering fuel vapors to the tank;

a valve connecting said upper chamber and said lower chamber for transporting fuel from the upper chamber to the lower chamber when pressure in the upper chamber exceeds pressure in the lower chamber by a predetermined amount; and means extending between said lower chamber and said upper chamber for establishing a reserve supply of fuel in the upper chamber.

2. The fuel system of claim 1, and further comprising a check valve preventing reverse fuel flow from said lower chamber into said first line.

3. The fuel system of claim 1, wherein said valve is a float valve.

4. The fuel system of claim 1, and further comprising a filter located in said lower chamber for preventing the flow of contaminants into the pump inlet.

5. The fuel system of claim 4, wherein said filter comprises a porous wall circumscribing a space directly below the pump inlet.

6. The fuel system of claim 1, and further comprising a return tube having an upper end connected to said fuel return line and a lower end proximate said partition, whereby returning fuel enters said upper chamber at a point near said partition.

7. The fuel system of claim 6, wherein said return tube is a vertical tube located in said upper chamber.

8. The fuel system of claim 1, and further comprising a filter located in said lower chamber for preventing the flow of contaminants into the pump inlet, said filter comprising a porous wall circumscribing a space directly below the pump inlet; said filler tube having a lower end connected to said partition at a point outside said wall structure; said valve comprising a float valve located in said lower chamber outside said porous wall.

9. The fuel system of claim 1, and further comprising a first check valve preventing fuel flow from said lower chamber into said first line; and a second valve preventing reverse flow from said vapor line into said upper chamber.

10. The fuel system of claim 1, and further comprising a check valve preventing fuel flow from said lower chamber into said first line; said check valve providing a resistance to flow from said first line into said lower chamber so that, when a reserve supply of fuel is established in the upper chamber, said means for establishing a reserve supply of fuel will provide a less resistive path for fuel flow into the lower chamber than said check valve.

11. The fuel system of claim 10, wherein said check valve automatically assumes a closed position when the fuel tank is empty so that pump suction is effective to open the valve.

12. The fuel system of claim 1, wherein said means establishing a reserve supply of fuel is an upstanding filler tube extending from said partition.

13. The fuel system of claim 1, wherein said means establishing a reserve supply of fuel is a float valve having a float located a substantial distance above said partition.

14. The fuel system of claim 1, and further comprising a control valve for permitting vapor to flow through the vapor line while preventing substantial flow of liquid fuel into the vapor line from said upper chamber.

15. The fuel system of claim 14, wherein said control valve is a check valve.

16. The fuel system of claim 14, wherein said control valve is a float valve.

17. A fuel pumping unit, comprising:

a reservoir;

a partition within said reservoir subdividing said reservoir into an upper chamber and a lower chamber;

a fuel pump in said upper chamber, said pump having an inlet communicating with said lower chamber and an outlet communicating with a space outside the reservoir;

a first fuel supply line for communicating a fuel tank with said lower chamber;

a second fuel supply line for communicating the pump outlet with an engine;

a fuel return line connected with said upper chamber for returning unused fuel to the pumping unit;

a vapor line connected with said upper chamber for removing fuel vapors from said upper chamber;

a valve connecting said upper chamber and said lower chamber for transporting fuel from the upper chamber to the lower chamber when pressure in the upper chamber exceeds the pressure in the lower chamber by a predetermined amount; and means extending between said lower chamber and said upper chamber for establishing a reserve supply of fuel in the upper chamber.

* * * * *